(12) United States Patent
Badal

(10) Patent No.: US 11,312,405 B2
(45) Date of Patent: Apr. 26, 2022

(54) COLLAPSIBLE ROCKING DEVICE FOR A PUSHCHAIR, PUSHCHAIR PROVIDED THEREWITH AND METHOD THEREFOR

(71) Applicant: Badal Beheer B.V., Leeuwarden (NL)

(72) Inventor: Anand Kumar Badal, Leeuwarden (NL)

(73) Assignee: Badal Beheer B.V., Leeuwarden (NL)

( * ) Notice: Subject to any disclaimer, the term of this patent is extended or adjusted under 35 U.S.C. 154(b) by 361 days.

(21) Appl. No.: 16/349,000

(22) PCT Filed: Nov. 10, 2017

(86) PCT No.: PCT/NL2017/050731
§ 371 (c)(1),
(2) Date: May 10, 2019

(87) PCT Pub. No.: WO2018/088904
PCT Pub. Date: May 17, 2018

(65) Prior Publication Data
US 2021/0291888 A1    Sep. 23, 2021

(30) Foreign Application Priority Data
Nov. 11, 2016  (NL) ...................................... 2017770

(51) Int. Cl.
*B62B 9/22* (2006.01)
(52) U.S. Cl.
CPC ...................................... *B62B 9/22* (2013.01)
(58) Field of Classification Search
CPC ........................................................ B62B 9/22
See application file for complete search history.

(56) References Cited

U.S. PATENT DOCUMENTS 2,888,086 A * 5/1959 O'Brien .................... B62B 9/22
104/302
5,002,144 A * 3/1991 McMahon ................ B62B 9/22
180/166

(Continued)

FOREIGN PATENT DOCUMENTS

| EP | 0415736 | 3/1991 |
|---|---|---|
| TW | 201117990 | 6/2011 |
| WO | WO-2004062977 | 7/2004 |

*Primary Examiner* — John D Walters
(74) *Attorney, Agent, or Firm* — Dawes Patent Law Group; Marcus C. Dawes

(57) ABSTRACT

The invention relates to a collapsible rocking device for rocking a pushchair provided with a frame and wheels, such a pushchair provided therewith and method therefor. The rocking device according to the invention comprises a housing provided with two guides and wheel holders which are arranged movably relative thereto and which are configured to receive a wheel of the pushchair to be rocked; at least one length-adjustable arm configured to adjust the mutual distance between the wheel holders; a number of collapsing mechanisms arranged in or on the guides, such that the rocking device can be moved from a position of use into a storage or transport position, and vice versa; at least one drive configured to drive the wheel holders such that the wheel holders make a translating movement in the direction of travel of the pushchair; and a controller configured to control the drive.

18 Claims, 3 Drawing Sheets

(56) References Cited

U.S. PATENT DOCUMENTS

Figure 1:
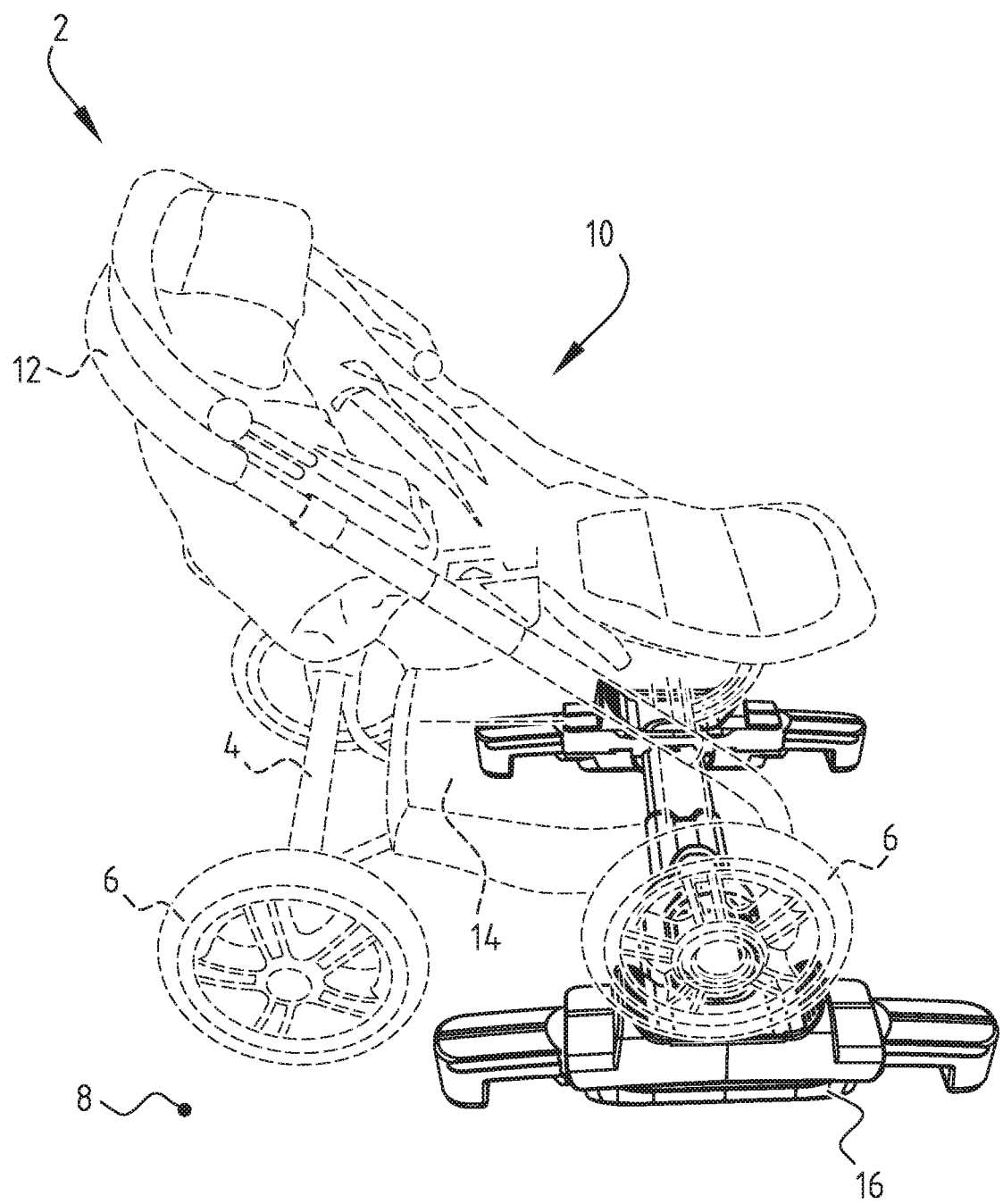

| | | | | |
|---|---|---|---|---|
| 5,099,528 A | * | 3/1992 | Wadman | B62B 9/22 |
| | | | | 180/166 |
| 7,971,885 B2 | * | 7/2011 | Sanders | B62B 9/22 |
| | | | | 280/47.1 |
| 2009/0064410 A1 | * | 3/2009 | Cohen | A47D 9/02 |
| | | | | 5/109 |

* cited by examiner

COLLAPSIBLE ROCKING DEVICE FOR A PUSHCHAIR, PUSHCHAIR PROVIDED THEREWITH AND METHOD THEREFOR

The invention relates to a collapsible rocking device suitable for rocking a pushchair.

A wide diversity of pushchairs is known in practice. Such pushchairs are used to move babies or small children around, or to let them sleep or rest therein. For this sleeping or resting it has been found useful to rock the pushchair. This requires another person in the vicinity of the pushchair, for instance a parent, to carry out the rocking. This parent is unable to engage at that moment in other activities. The continuous presence of this parent is moreover usually detrimental to the child in question learning to sleep independently.

NL-2013712 describes a rocking device for rocking a pushchair, wherein the rocking device is provided with a drive with a part arranged rotatably relative to the housing and engaging on a wheel of the pushchair. Rocking of the pushchair can be automatically performed by means of such a rocking device. It has however been found that there is a greater need for reliability and control of the rocking movement.

An object of the invention is to obviate or in any case reduce the above stated problems, and to provide a rocking device which can be taken along easily and at the same time provides sufficient control of the rocking movement during use.

This object is achieved with the collapsible rocking device according to the invention for rocking a pushchair provided with a frame and wheels, wherein the rocking device comprises:

- a housing provided with two guides, wherein a support foot is provided at or close to each outer end of the guides, and two wheel holders arranged movably over the guides relative to the housing and configured to receive a wheel of the pushchair to be rocked;
- at least one length-adjustable arm configured to adjust the mutual distance between the wheel holders;
- a number of collapsing mechanisms arranged in or on the guides, such that the rocking device can be moved from a position of use into a storage or transport position, and vice versa;
- at least one drive configured to drive the wheel holders such that the wheel holders make a translating movement in the direction of travel of the pushchair; and
- a controller configured to control the drive.

Providing a rocking device which is collapsible makes it possible to take along the rocking device in effective manner. The rocking device can thus for instance be taken along in a carrier on the pushchair or in a separate carrier bag.

According to the invention, the collapsible rocking device is provided with a housing wherein at least two guides are arranged. These guides extend in use on either side of the pushchair, as seen in the travel direction. By providing wheel holders which are movable relative to the guides it is possible to arrange preferably at least two wheels of the pushchair in the wheel holders of the guides. The two front wheels of the pushchair or the two rear wheels of the pushchair are here for instance arranged in the wheel holders. A controlled rocking movement is hereby made possible, wherein it is for instance avoided that the pushchair turns or rolls away slowly.

Having the wheel holders make a translating movement relative to the guides achieves a rocking effect for the pushchair. The movement is preferably an oscillating translating movement. These guides are provided here at or close to the outer ends of a support foot. The guide can hereby be placed on a ground surface in stable manner. The pushchair moves with the wheel holders over the guides and is hereby not impeded by an uneven ground surface. A controllable and reliable rocking movement of the pushchair is hereby provided in effective manner. The wheels on which the parking brake of the pushchair has been applied are preferably placed in the rocking device. The movement of the wheel holders relative to the guide is enabled by arranging at least one drive. The drive is preferably configured such that at the end of the translating movement, i.e. when the direction of the movement reverses, a gradual transition is achieved. Use can be made for this purpose of a resilient or damping effect.

According to the invention, the drive or drives are controlled by a controller. The controller is preferably further configured to be able to adjust the desired distance and the employed frequency of the translating movement. The stroke length of the translating movement is for instance in the range of 20-80 cm. Other, smaller ranges, for instance a range of 3-50 cm, are however also possible. A frequency of 0.1-4 vibrations per second has for instance been found effective, and preferably 0.1-1 vibration per second. It will be apparent that the stroke length and frequency employed can also depend on the weight in the pushchair. In a currently preferred embodiment according to the invention the controller provides a number of rocking programs which can be activated. These programs for instance have different frequencies, stroke length and/or acceleration and deceleration. The rocking movement can hereby be set as desired, and for instance be adjusted to the specific circumstances. In such an embodiment it is also possible to set one or more of said settings to a continuous or semi-continuous setting.

In a currently preferred embodiment the drive comprises a so-called direct current motor, also referred to as a DC motor. Such a motor has been found in practice to be reliable, so that the reliability of the rocking movement can be further increased thereby. Sensors are preferably used for position determination of the wheel holders. In a currently preferred embodiment use is made of so-called optical sensors. It has been found that a robust drive is hereby provided.

By providing collapsing mechanisms arranged in or on the guides the rocking device can be moved from a position of use into the storage or transport position, and vice versa, in effective manner. The collapsing mechanisms preferably make it possible to reduce the length of the guides in the stored state. The rocking device according to the invention hereby becomes relatively easy to handle for a user, for instance a parent. This also makes it easier to take along the collapsible rocking device, when in the storage position, on the pushchair. This increases the user-friendliness of the rocking device.

According to the invention, at least one length-adjustable arm is further configured to adjust the mutual distance between the wheel holders. Being able to alter the length of the arm makes it possible to adjust the mutual distance between wheel holders on either side of the pushchair, as seen in the direction of travel thereof. It is hereby for instance possible to take into consideration different types of pushchair, particularly different track widths thereof. In addition, the dimensions of the collapsible rocking device according to the invention in the stored state can hereby be further reduced. This increases the ease of handling and flexibility of the rocking device according to the invention.

In one of the currently preferred embodiments the wheel holder is provided with a gear rack which is connected in use to a pinion arranged on a drivable shaft of the drive. It has been found that a drive which is robust and reliable in practice and with which the wheel holder is movable relative to the guide is hereby provided. Sufficient stability is hereby further provided for rocking the pushchair with different loads.

The rocking distance covered by a wheel holder relative to the guide during use can preferably be set. A flexible collapsible rocking device which can for instance be adapted to the specific pushchair is hereby provided. In this way a rocking device according to the invention can also be readily used with another pushchair. This advantage is further enhanced by the adjustable length of the arm, whereby the track width of the rocking device according to the invention can be set. This increases the flexibility and usability of the collapsible rocking device according to the invention.

An additional advantage of the collapsible rocking device according to the invention is that it can be folded out in simple manner, after which the pushchair can be placed thereon. The wheels can here optionally be placed in the wheel holder using a type of form closure and then be snapped into the holder and/or be actively fixed thereon using for instance a fastening mechanism. No operations on or adjustments to the pushchair are therefore required. This increases the ease of taking the collapsible rocking device according to the invention into use.

A further advantage of the rocking device according to the invention is that, in addition to being in a compact state, in the collapsed state there are no parts which protrude in hazardous manner and may thereby pose a danger to others or to goods.

In a currently preferred embodiment according to the invention the collapsible rocking device further comprises a second drive, wherein each wheel holder of the rocking device is driven by a separate drive.

Providing a separate drive per wheel holder simplifies the driving significantly. The transmission between drive and wheel holder can thus be given a relatively simple form, and there is for instance no need for a long shaft extending over the whole width of the wheel device between the two wheel holders.

Preferably also provided in combination with the separate drive is a tracking and/or synchronizing system which is configured to synchronize the movement of the wheel holders. In the context of the invention synchronizing the movement is understood to mean starting and stopping the movement of the wheel holders relative to the guides substantially simultaneously, and moving the wheel holders at equal speed and parallel to each other. This further increases the controllability of the rocking movement.

In an advantageous preferred embodiment according to the invention the controller is provided with a transmitter-receiver and further configured for communication with an external control.

Providing a transmitter-receiver enables wireless communication with the controller of the collapsible device according to the invention. Use can for instance be made here of a separate remote control or a so-called app on a mobile phone. It will be apparent that other controls are also possible according to the invention. Use is for instance made here of a radio signal such as Bluetooth or Wi-Fi. A sound sensor can further be provided. This can for instance be used to react to voice commands. It is also possible to detect sound made by a child in the pushchair, for instance a crying baby, and, with this, to switch on or adjust the rocking movement.

In a further advantageous preferred embodiment according to the invention the rocking device comprises a fastening for fixing a rocking device at a desired track width setting, wherein the mutual distance between the wheel holders substantially corresponds to the track width of the pushchair to be rocked.

By providing a setting option the rocking device can be used for different types of pushchair. Providing a fastening achieves that a safe operation can be guaranteed.

In a currently preferred embodiment the collapsing mechanisms are provided with separate rotation axes extending substantially in a direction transversely of the translating movement in the direction of travel of the pushchair and in use substantially also extending in the direction transversely of the supporting surface on which the support feet are placed.

Providing rotation axes enables the guides for which the collapsing mechanisms are preferably provided to be collapsed in effective manner Having the rotation axes extend substantially upward in the situation of use in this preferred embodiment achieves that the collapsing movement is performed substantially in a flat plane. This enables an effective and user-friendly collapsing movement.

In a further advantageous preferred embodiment the collapsible rocking device comprises two length-adjustable arms. This further increases the flexibility for adjusting the location of the wheel holders. This increases the flexibility for handling of different types of pushchair. In a further embodiment use can be made here of telescopic arms.

In a further advantageous preferred embodiment according to the invention the collapsible rocking device further comprises a solar panel.

By providing a solar panel it is possible to provide a self-sufficient system for the collapsible rocking device. For storing energy use is preferably made of a battery, which is preferably arranged in the housing. The solar panel can here charge the battery. It is also possible to charge the battery via a mains connection so that the collapsible rocking device according to the invention can be used at any desired location. It is also possible to apply a combination of mains power supply, battery power supply and/or external energy sources, including a solar panel, in use.

The invention further also relates to a pushchair provided with a collapsible rocking device as described above and/or a method for rocking such a pushchair. The method here comprises of:

providing a pushchair and collapsible rocking device as described above;

moving the rocking device from the storage or transport position into a position of use;

placing the wheels of the pushchair in the wheel holders; and activating the rocking device.

The pushchair and/or method provide similar advantages and effects as described for the rocking device.

Figures 2A, 2B:
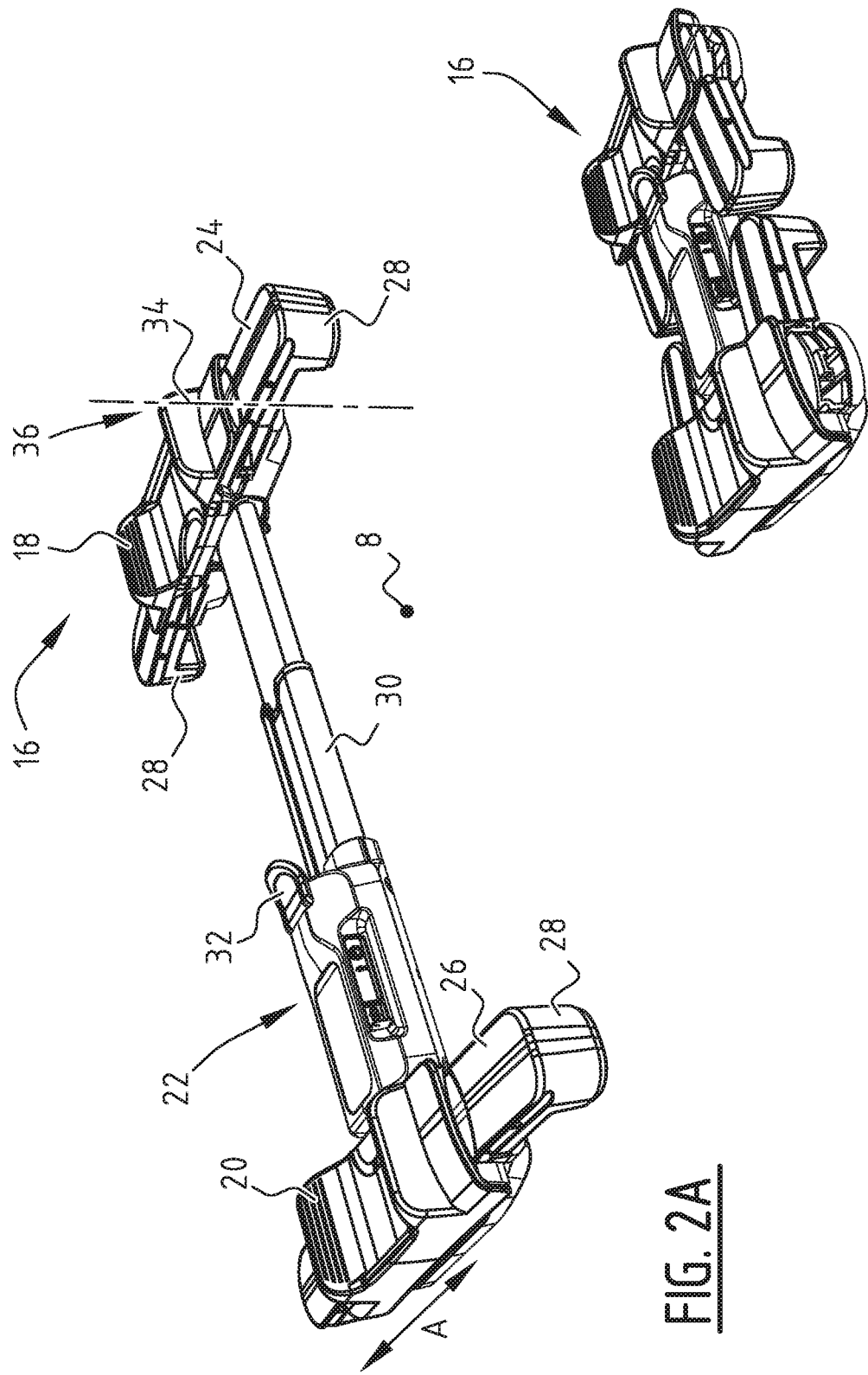

Further advantages, features and details of the invention are elucidated on the basis of preferred embodiments thereof, wherein reference is made to the accompanying drawings, in which:

FIG. 1 shows a pushchair provided with a rocking device according to the invention;

FIGS. 2A and B show a view of the rocking device of FIG. 1; and

Figure 3:
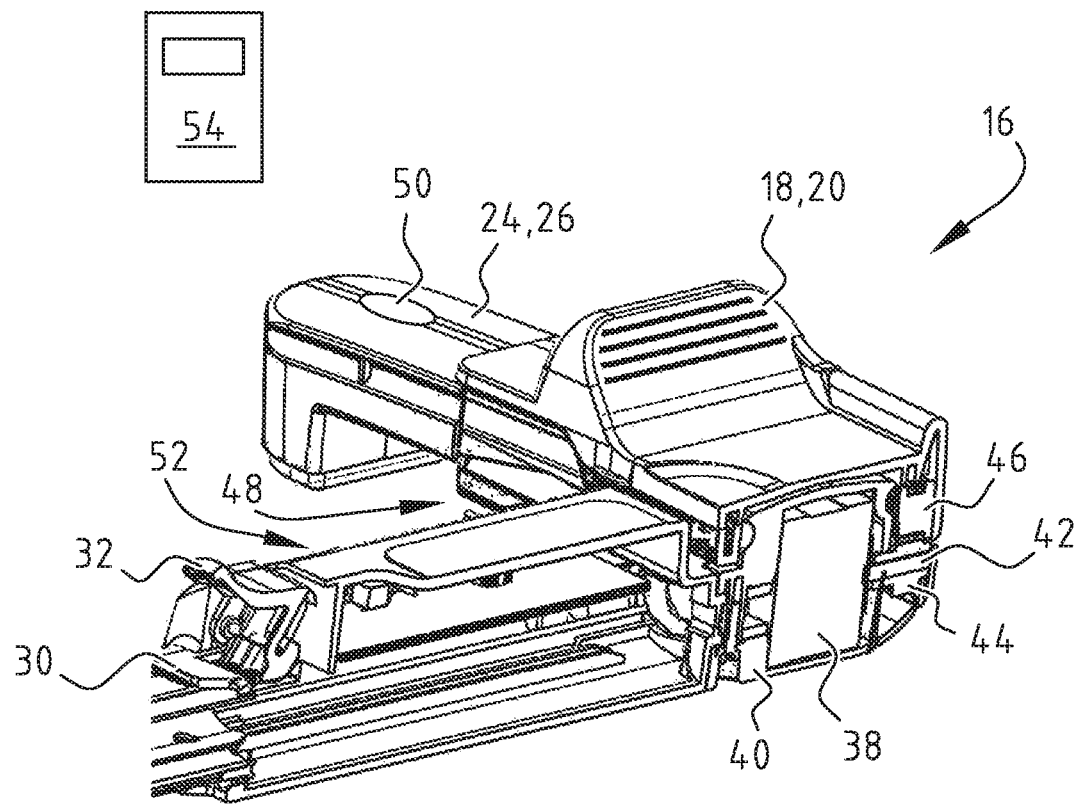

FIG. 3 shows a cross-section of the rocking device of FIGS. 1 and 2 in an extended state.

Pushchair 2 (FIG. 1) is provided with frame 4 on which four wheels 6, which rest on ground surface 8 during use, are provided in the shown embodiment. Pushchair 2 comprises seat or reclining part 10 which can be moved forward using bar 12 and is provided with storage compartment 14. In the shown embodiment two wheels 6 have been placed in rocking device 16.

Rocking device 16 (FIG. 2) is provided with first wheel holder 18 and second wheel holder 20. Rocking device 16 is further provided with housing 22, first guide 24 and second guide 26. In the shown embodiment guides 24, 26 are provided integrally with support feet 28 at the outer ends. Wheel holders 18, 20 are configured for movement in direction A over guides 24, 26. Arm 30 enables setting of the mutual distance between wheel holders 18, 20. In the shown embodiment arm 30 is provided in the form of telescopic elements. Further provided is fastening 32, whereby arm 30 can be fixed at a desired position.

Collapsible rocking device 16 can be slid inward by sliding arm 30 in housing 22, and can thereby be moved from a folded-out position of use (FIG. 2A) into a collapsed transport or storage position (FIG. 2B). While moving between the different positions, in the shown embodiment feet 28 fold around respective rotation axes 34 and thereby form a compact whole. In the shown embodiment rotation axis 34 of collapsing mechanism 36 extends substantially vertically relative to ground surface 8.

In the shown embodiments (FIG. 3) direct current motor 38 is arranged in sub-housing 40 of rocking device 16. Drive 38 further comprises drive shaft 42 on which pinion 44 is arranged. Pinion 44 is in engagement with gear rack 46 of wheel holder 18, 20. By rotation of shaft 42 gear rack 46 will be moved by means of pinion 44, whereby wheel holders 18, 20 make a translating movement over guides 24, 26. Battery 48 can further be provided in sub-housing 40, preferably in combination with a mains power supply connection. Alternatively, it is also possible to provide a single drive, for instance direct current motor 38, which drives both wheel holders 18, 20 by means of a drive shaft.

In one of the shown embodiments guide 24, 26 is optionally provided with solar panel 50 (FIG. 3). It will be apparent that solar panel 50 can also be provided at different locations, including on pushchair 2. Such an optional solar panel 50 can be used for powering battery 48.

Also provided in the shown embodiment is controller 52 which is able to communicate wirelessly with mobile phone or remote control 54. By means of control 54 a user can control controller 52 and thereby change settings and/or activate rocking device 16.

For the benefit of pushchair 2 collapsible rocking device 16 can be taken along in effective manner, for instance in storage compartment 14. As soon as pushchair 2 is parked at a desired location and a child is to be rocked therein, rocking device 16 is taken out and folded out. During this folding out supports 28 are rotated about rotation axes 34 and arm 30 is set to the desired track width, i.e. the mutual distance between wheel holders 18, 20, using fastening 32. Wheels 6 of pushchair 2 are then placed in wheel holders 18, 20 and fixed there, preferably by means of a form closure or other alternative coupling. Controller 52 activates drive 38, whereby wheel holders 18, 20 begin to translate over guides 24, 26 and thereby impart the rocking movement to pushchair 2. This provides the rocking movement. The distance and/or frequency of the translating movement can preferably be set using controller 52. After the rocking has stopped, rocking device 16 can be stored by making a collapsing movement of support feet 28 and arm 30. Rocking device 16 can subsequently be transported or stored in effective manner.

The invention is by no means limited to the above described preferred embodiments thereof. The rights sought are defined by the following claims, within the scope of which many modifications can be envisaged.

The invention claimed is:

1. A collapsible rocking device for rocking a pushchair provided with a frame and wheels, the rocking device comprising:
   a housing provided with two guides, wherein a support foot is provided at or close to each outer end of the guides, and two wheel holders arranged movably over the guides relative to the housing and configured to receive a wheel of the pushchair to be rocked;
   at least one length-adjustable arm configured to adjust the mutual distance between the wheel holders;
   a number of collapsing mechanisms arranged in or on the guides, such that the rocking device can be moved from a position of use into a storage or transport position, and vice versa;
   at least one drive configured to drive the wheel holders such that the wheel holders make a translating movement in the direction of travel of the pushchair; and
   a controller configured to control the drive.

2. The collapsible rocking device as claimed in claim 1, wherein the drive comprises a direct current motor.

3. The collapsible rocking device according to claim 2, wherein the wheel holder is provided with a gear rack which is operatively connected in use to a pinion arranged on a drivable shaft of the drive.

4. The collapsible rocking device according to claim 3, further comprising a second drive, wherein each wheel holder is driven by a separate drive.

5. The collapsible rocking device according to claim 4, further comprising a tracking and/or synchronizing system configured to synchronize the movement of the wheel holders.

6. The collapsible rocking device as claimed in claim 1, wherein the wheel holder is provided with a gear rack which is operatively connected in use to a pinion arranged on a drivable shaft of the drive.

7. The collapsible rocking device according to claim 6, further comprising a fastening configured to fix the rocking device at a desired track width setting, wherein the mutual distance between the wheel holders substantially corresponds to the track width of the pushchair to be rocked.

8. The collapsible rocking device according to claim 7, wherein the collapsing mechanisms are provided with separate rotation axes extending substantially in a direction transversely of the translating movement in the direction of travel of the pushchair and in use substantially also extending in a direction transversely of a supporting surface on which the support feet are placed.

9. The collapsible rocking device according to claim 8, further comprising two length-adjustable arms.

10. The collapsible rocking device as claimed in claim 1, further comprising a second drive, wherein each wheel holder is driven by a separate drive.

11. The collapsible rocking device as claimed in claim 10, further comprising a tracking and/or synchronizing system configured to synchronize the movement of the wheel holders.

12. The collapsible rocking device as claimed in claim 1, wherein the controller is provided with a transmitter-receiver and is configured for communication with an external control.

13. The collapsible rocking device as claimed in claim 1, further comprising a fastening configured to fix the rocking device at a desired track width setting, wherein the mutual distance between the wheel holders substantially corresponds to the track width of the pushchair to be rocked.

14. The collapsible rocking device as claimed in claim 1, wherein the collapsing mechanisms are provided with separate rotation axes extending substantially in a direction transversely of the translating movement in the direction of travel of the pushchair and in use substantially also extending in a direction transversely of a supporting surface on which the support feet are placed.

15. The collapsible rocking device as claimed in claim 1, further comprising two length-adjustable arms.

16. The collapsible rocking device as claimed in claim 1, further comprising a solar panel.

17. A method for rocking a pushchair, comprising the steps of:
- providing a pushchair and collapsible rocking device for rocking a pushchair provided with a frame and wheels, the rocking device comprising a housing provided with two guides, wherein a support foot is provided at or close to each outer end of the guides, and two wheel holders arranged movably over the guides relative to the housing and configured to receive a wheel of the pushchair to be rocked, at least one length-adjustable arm configured to adjust the mutual distance between the wheel holders, a number of collapsing mechanisms arranged in or on the guides, such that the rocking device can be moved from a position of use into a storage or transport position, and vice versa, at least one drive configured to drive the wheel holders such that the wheel holders make a translating movement in the direction of travel of the pushchair, and a controller configured to control the drive;
- moving the rocking device from the storage or transport position into a position of use;
- placing the wheels of the pushchair in the wheel holders; and
- activating the rocking device.

18. The method according to claim 17, wherein providing the pushchair and collapsible rocking device for rocking the pushchair provided with the frame and wheels comprises providing the collapsing mechanisms with separate rotation axes extending substantially in a direction transversely of the translating movement in the direction of travel of the pushchair and in use substantially also extending in a direction transversely of a supporting surface on which the support feet are placed.

\* \* \* \* \*